(12) United States Patent
Kurita et al.

(10) Patent No.: US 10,336,879 B2
(45) Date of Patent: Jul. 2, 2019

(54) RIGID POLYURETHANE FOAM

(71) Applicant: ACHILLES CORPORATION, Tokyo (JP)

(72) Inventors: Takeshi Kurita, Tokyo (JP); Yamato Koike, Tokyo (JP)

(73) Assignee: ACHILLES CORPORATION, Tokyo (JP)

( * ) Notice: Subject to any disclaimer, the term of this patent is extended or adjusted under 35 U.S.C. 154(b) by 0 days.

(21) Appl. No.: 15/550,134

(22) PCT Filed: Feb. 24, 2016

(86) PCT No.: PCT/JP2016/055334
§ 371 (c)(1),
(2) Date: Aug. 10, 2017

(87) PCT Pub. No.: WO2016/136769
PCT Pub. Date: Sep. 1, 2016

(65) Prior Publication Data
US 2018/0030232 A1 Feb. 1, 2018

(30) Foreign Application Priority Data

Feb. 24, 2015 (JP) .................................. 2015-033466
May 15, 2015 (JP) .................................. 2015-099811
Dec. 17, 2015 (JP) .................................. 2015-246451

(51) Int. Cl.
C08J 9/14 (2006.01)
C08G 18/48 (2006.01)
C08G 18/18 (2006.01)
C08G 18/42 (2006.01)
C08G 18/50 (2006.01)
C08G 18/72 (2006.01)
C08G 18/76 (2006.01)
C08G 18/20 (2006.01)
C08G 18/40 (2006.01)
C08G 101/00 (2006.01)

(52) U.S. Cl.
CPC .............. C08J 9/146 (2013.01); C08G 18/18 (2013.01); C08G 18/2027 (2013.01); C08G 18/2063 (2013.01); C08G 18/4018 (2013.01); C08G 18/42 (2013.01); C08G 18/4211 (2013.01); C08G 18/4213 (2013.01); C08G 18/48 (2013.01); C08G 18/4829 (2013.01); C08G 18/5021 (2013.01); C08G 18/5033 (2013.01); C08G 18/721 (2013.01); C08G 18/7621 (2013.01); C08G 18/7664 (2013.01); C08G 18/7671 (2013.01); C08J 9/141 (2013.01); C08J 9/144 (2013.01); C08J 9/149 (2013.01); C08G 2101/005 (2013.01); C08G 2101/0025 (2013.01); C08G 2101/0058 (2013.01); C08J 2203/14 (2013.01); C08J 2203/162 (2013.01); C08J 2203/182 (2013.01); C08J 2205/10 (2013.01); C08J 2375/06 (2013.01); C08J 2375/08 (2013.01)

(58) Field of Classification Search
CPC ................ C08G 18/18; C08G 18/2027; C08G 18/2063; C08G 18/4018; C08G 18/42; C08G 18/4211; C08G 18/4213; C08G 18/48; C08G 18/4829; C08G 18/5021; C08G 18/5033; C08G 18/721; C08G 18/7621; C08G 18/7664; C08G 18/7671; C08G 2101/0025; C08G 2101/005; C08G 2101/0058; C08J 9/141; C08J 9/144; C08J 9/146; C08J 9/149; C08J 2203/14; C08J 2203/162; C08J 2203/182; C08J 2205/10; C08J 2375/06; C08J 2375/08
See application file for complete search history.

(56) References Cited

U.S. PATENT DOCUMENTS 8,658,708 B2 2/2014 Loh et al.
2008/0064778 A1* 3/2008 Hasegawa .......... C08G 18/4879
521/137
2015/0051304 A1* 2/2015 Shieh ....................... C08J 9/143
521/98

FOREIGN PATENT DOCUMENTS

| JP | H05-179043 A | 7/1993 |
|----|--------------|--------|
| JP | 10231346 * | 9/1998 |
| JP | H10-231346 A | 9/1998 |
| JP | 2007-269820 A | 10/2007 |
| JP | 2011-508020 A | 3/2011 |

OTHER PUBLICATIONS

PCT/ISA/210, "International Search Report for International Application No. PCT/JP2016/055334," dated Mar. 22, 2016.

* cited by examiner

Primary Examiner — John M Cooney
(74) Attorney, Agent, or Firm — Manabu Kanesaka

(57) ABSTRACT

A rigid polyurethane foam which has ultrafine cells, has a low thermal conductivity of 0.0190 W/(m·K) or lower, exhibits excellent heat insulating properties and flame retardancy, and has very little impact on global warming, without using a special apparatus such as a gas loading device. Provided is a rigid polyurethane foam which is obtained by mixing and reacting raw materials including a polyol, a polyisocyanate, a blowing agent, and a catalyst. The rigid polyurethane foam contains the polyol containing a polyester polyol having an aromatic component concentration of 17-35 wt. %, and a non-amine-based polyether polyol and/or an aromatic amine-based polyether polyol; the polyisocyanate in which MDI/TDI are mixed at a ratio of 4/6 to 9/1; and the blowing agent containing a halogenated olefin.

5 Claims, No Drawings

RIGID POLYURETHANE FOAM

RELATED APPLICATIONS

The present application is National Phase of International Application No. PCT/JP2016/055334 filed Feb. 24, 2016, and claims priorities from Japanese Application No. 2015-033466, filed Feb. 24, 2015, Japanese Application No. 2015-099811, filed May 15, 2015, and Japanese Application No. 2015-246451, filed Dec. 17, 2015, the disclosure of which is hereby incorporated by reference herein in its entirety.

TECHNICAL FIELD

The present invention relates to a rigid polyurethane foam, obtained by reaction of a specific polyol, a specific polyisocyanate, and a specific blowing agent in the presence of a catalyst, and the like, more particularly to a rigid polyurethane foam having a minute cell size of the foam, excellent thermal insulation property and flame retardancy, and small influence on global warming.

BACKGROUND ART

Non Patent Literature 1 considers the contribution of radiation by the rigid polyurethane foam to thermal conductivity and describes that the smaller the radiation, the smaller the diameter of a cell forming a foam.

As described above, it is known that when the cell diameter can be made smaller, the radiation is decreased, and consequently, the thermal conductivity can be decreased and a foam having the excellent thermal insulation property can be easily obtained.

For example, Non Patent Literature 2 describes that, in order to decrease the cell diameter, the number of cells of the obtained rigid polyurethane foam is increased by introduction of a large amount of air during a stirring (mixing) step of a urethane starting material component to make nuclei of bubbles; in other words, the cell diameter is made small.

The present applicant previously proposed a method for decreasing a cell diameter of an obtained foam by introducing a specific amount of gas into at least one of a polyisocyanate component and a polyol component using a gas loading apparatus equipped with forced agitation blades thereby making a state in which fine bubbles are apparently uniformly dispersed (for example, a paste or a whipped cream state), and then performing a urethane forming reaction (see Patent Literature 1).

CITATION LIST

Patent Literature

Patent Literature 1: JP 2007-269820 A

Non Patent Literature

Non Patent Literature 1: L. D. Booth, "Radiation Contribution as an Element of Thermal Conductivity", Polyurethanes World Congress 1987, p. 85-90
Non Patent Literature 2: B. Kanner and T. G. Decker, "Urethane Foam Formation—Role of the Silicone Surfactant", J. Cell. Plast. 5, (1969), p. 32-39

SUMMARY OF INVENTION

Technical Problem

The rigid polyurethane foam, obtained by the method described in Patent Literature 1, however, has a thermal conductivity of more than 0.020 W/(m·K), and there is room to improve the thermal insulation property, the flame retardancy, and the like.

Recently, as the blowing agent used in the production of the rigid polyurethane foam, hydrofluorocarbon (HFC), hydrocarbon (HC), carbonic acid gas, which do not have a chlorine atom in their molecules, have been used.

However, although HFC [for example, HFC-134a (1,1,1,2-tetrafluoroethane), HFC-245fa (1,1,1,3,3-pentafluoropropane), HFC-365mfc (1,1,1,3,3-pentafluorobutane), and the like] has a low Ozone Depletion Potential, it has a high global warming potential, and thus the use thereof is oriented toward regulation in the future, in terms of the global environment protection.

HC [for example, n-pentane, c-pentane, iso-pentane, iso-butane, and the like] has a low Ozone Depletion Potential and a comparatively low global warming potential, but is flammable and thus it is difficult to handle it, and, in addition, it is poor in the flame retardancy.

The carbonic acid gas itself has a high thermal conductivity, and thus the thermal conductivity tends to be increased as the rigid polyurethane foam.

Under the circumstances described above, the present invention aims at providing a rigid polyurethane foam having minute cells, a low thermal conductivity of 0.0190 W/(m·K) or less, excellent thermal insulation property and flame retardancy, and a very little influence on the global warming, even without using a specific apparatus such as the gas loading apparatus described above.

Solution to Problem

A rigid polyurethane foam of the present invention is obtained by mixing starting materials including a polyol, a polyisocyanate, a blowing agent, and a catalyst, and reacting the mixture, in which the polyol includes a polyester polyol having an aromatic concentration of 17 to 35% by weight, and a non-amine-based polyether polyol and/or aromatic amine-based polyether polyol, the polyisocyanate is a mixture of MDI (diphenylmethane diisocyanate)/TDI (tolylene diisocyanate) in a weight ratio of 4/6 to 9/1, and the blowing agent includes a halogenated olefin.

At that time, a halogenated olefin-containing blowing agent has preferably a global warming potential of 10 or less. The halogenated olefin may be used alone or as a mixture of multiple kinds thereof, and may also be used together with a blowing agent other than the halogenated olefin, so long as the property described above is satisfied. The halogenated olefin is preferably 1,1,1,4,4,4-hexafluorobutene.

It is more preferable that the blowing agent is added in an amount of 5 to 70 parts by weight based on 100 parts by weight of the polyol.

In addition, the rigid polyurethane foam of the present invention has a density of 33 to 60 kg/m$^3$, a cell size of 230 μm or less, and a thermal conductivity of 0.0190 W/(m·K) or less.

Advantageous Effects of Invention

The rigid polyurethane foam of the present invention can certainly realize the suppression of the environmental destruction, because the blowing agent containing the halogenated olefin has a global warming potential of 10 or less.

The rigid polyurethane foam of the present invention is obtained by reaction of the specific polyol and the specific polyisocyanate in the presence of the blowing agent as described above, and thus it is a uniformly well-ordered foam having a specific density and a small cell size, has a low thermal conductivity, measured in accordance with JIS A 1412, of 0.0190 W/(m·K), the excellent thermal insulation property, and the high flame retardancy.

Further, when as the halogenated olefin having the property described above, 1,1,1,4,4,4-hexafluorobutene is selected, it is possible to make the thermal conductivity of 0.0180 W/(m·K) or less.

DESCRIPTION OF EMBODIMENT

The rigid polyurethane foam of the present invention can be obtained by mixing starting materials including a polyol, a polyisocyanate, a blowing agent, a catalyst, and the like, and reacting the mixture.

[Polyol]

In the present invention, as the polyol, both a polyester polyol having an aromatic concentration of 17 to 35% by weight, and a non-amine-based polyether polyol and/or an aromatic amine-based polyether polyol.

For example, when the polyester polyol having an aromatic concentration of 17 to 35% by weight is used alone as the polyol, the resin backbone of the rigid polyurethane foam is week, and thus the obtained foam may be sometimes shrunk. Alternatively, when the non-amine-based polyether polyol and/or aromatic amine-based polyether polyol is used alone, using no polyester polyol described above, as the polyol, the rigid polyurethane foam having the desired thermal insulation property cannot be obtained.

The polyester polyol having an aromatic concentration of 17 to 35% by weight and the non-amine-based polyether polyol and/or aromatic amine-based polyether polyol (hereinafter referred also to as the "specific polyether polyol") are preferably mixed so as to be a ratio (weight ratio) of the polyester polyol having an aromatic concentration of 17 to 35% by weight/the specific polyether polyol=3/7 to 9/1.

The blending ratio of the specific polyether polyol to the polyester polyol is too high, it is difficult to make the cell size of the obtained foam minute; as a result, it is difficult to improve the thermal insulation property. On the other hand, the blending ratio of the specific polyether polyol is too low, the obtained foam is easily shrunk.

(Polyester Polyol)

In the present invention, in order to improve the thermal insulation property, the polyester polyol having an aromatic concentration of 17 to 35% by weight is used.

When the aromatic concentration is less than 17% by weight, the desired thermal insulation property cannot be obtained. When the aromatic concentration is more than 35% by weight, the viscosity of the polyol is high, and it is not useful for the production of a foam.

Such a polyester polyol having an aromatic concentration of 17 to 35% by weight may include aromatic polyester polyols, obtained by a usual esterification reaction of a polybasic carboxylic acid and a polyhydric alcohol, aromatic polyester polyols, obtained by ester interchange of a polyester resin with a polyhydric alcohol, and the like. The polybasic carboxylic acid may include, for example, polybasic aromatic acids and anhydrides thereof such as phthalic acid, phthalic anhydride, isophthalic acid, terephthalic acid, naphthalene dicarboxylic acid and trimellitic acid, and the like. They may be used alone or as an appropriate mixture of two or more kinds. On the other hand, the polyhydric alcohol may include ethylene glycol, propylene glycol, glycerin, trimethylol propane, pentaerythritol, sorbitol, sucrose, bisphenol A, and the like. They may be used alone or as an appropriate mixture of two or more kinds.

The hydroxyl value and the molecular weight of the polyester polyol having an aromatic concentration of 17 to 35% by weight are not particularly limited, and the hydroxyl value is preferably from 200 to 500 mg KOH/g and the molecular weight is preferably from 200 to 600.

(Polyether Polyol)

In the present invention, in order to suppress the shrinkage of the obtained foam and to promote the microminiaturization of the cells, the non-amine-based polyether polyol and/or aromatic amine-based polyether polyol is used.

When an aliphatic amine-based polyether polyol is used together with the polyester polyol having an aromatic concentration of 17 to 35% by weight instead of the non-amine-based polyether polyol and the aromatic amine-based polyether polyol, the cell size is increased and the desired thermal conductivity cannot be obtained.

The non-amine-based polyether polyol may include non-amine-based polyether polyols, obtained by addition polymerization of one or more alkylene oxides such as ethylene oxide, propylene oxide, and butylene oxide to a polyhydric alcohol such as ethylene glycol, propylene glycol, glycerin, trimethylol propane, pentaerythritol, sorbitol, sucrose, or bisphenol A, and the like. The non-amine-based polyether polyol may be used alone or as an appropriate mixture of two or more kinds.

The hydroxyl value and the molecular weight of such a non-amine-based polyether polyol are not particularly limited, and the hydroxyl value is preferably from 300 to 700 mg KOH/g and the molecular weight is preferably from 500 to 800.

The aromatic amine-based polyether polyol may include aromatic amine-based polyether polyols, obtained by ring-opening addition polymerization of one or more alkylene oxides such as ethylene oxide, propylene oxide, and butylene oxide to an amine having an aromatic ring such as phenylene diamine, toluene diamine, diaminodiphenyl methane, or a Mannich condensate, and the like. The aromatic amine-based polyether polyol may be used alone or as an appropriate mixture of two or more kinds.

The hydroxyl value and the molecular weight of the aromatic amine-based polyether polyol are not also particularly limited, and the hydroxyl value is preferably from 300 to 600 mg KOH/g and the molecular weight is preferably from 400 to 700.

When both the non-amine-based polyether polyol and the aromatic amine-based polyether polyol are used, the blending ratio (weight ratio) is not particularly limited, and it is satisfied that the ratio is within a range of 9/1 to 1/9.

[Polyisocyanate]

In the present invention, as the polyisocyanate, a mixture of MDI (diphenylmethane diisocyanate)/TDI (tolylene diisocyanate) in a weight ratio of 4/6 to 9/1 is used.

When the blending ratio of MDI to TDI is too high, the desired thermal conductivity cannot be obtained. When the blending ratio of MDI to TDI is too low, the product is shrunk. MDI/TDI is preferably from 5/5 to 8/2.

MDI (diphenylmethane diisocyanate) in the present invention may include monomeric MDIs (4,4'-MDI, and the like), polymeric MDIs (mixtures of monomeric MDI and polyisocyanate with a high molecular weight), modified MDIs (a partial chemical reaction of MDI, for example, MDIs in which an ester group, urea group, biuret group, allophanate group, isocyanurate group, or urethane group is partially bonded to MDI), and the like. MDI may be used alone or as an appropriate mixture of two or more kinds. Especially, polymeric MDIs having an NCO content of about 30 to 32% are preferable.

TDI (tolylene diisocyanate) in the present invention may include 2,4-tolylene diisocyanate, 2,6-tolylene diisocyanate, and the like. TDI may be used alone or as an appropriate mixture of two or more kinds.

It is satisfied that the NCO content in TDI is adjusted to about 47 to 49%.

The polyisocyanate in which MDI and TDI are mixed in a ratio of 4/6 to 9/1 may be used in an isocyanate index (NCO groups/the OH groups [equivalent ratio]×100) of 100 to 160.

[Blowing Agent]

The blowing agent used in the present invention contains a halogenated olefin and has a low global warming potential of 10 or less. The halogenated olefin itself has a low thermal conductivity, and thus the rigid polyurethane foam having the excellent thermal insulation property can be certainly obtained.

Examples of the halogenated olefin may include, for example, hydrofluoroolefins (HFO) such as 1-chloro-3,3,3-trifluoropropene (HFO-1233zd), 1,3,3,3-tetrafluoropropene (HFO-1234ze), 2,3,3,3-tetrafluoropropene (HFO-1234yf), 1,1,2,3,3-pentafluoropropene (HFO-1225yc), 1,1,1,4,4,4-hexafluorobutene (HFO-1336mzz), stereoisomers thereof, and the like. They may be used alone or as an appropriate mixture of two or more kinds.

Especially, 1,1,1,4,4,4-hexafluorobutene (HFO-1336mzz) having a global warming potential of 2 can exert the following excellent effects:

i) It is easy to handle it because the vapor pressure of HFO-1336mzz itself is lower than those of other HFOs;

ii) It is easy to obtain the rigid polyurethane foam having more excellent thermal insulation property because the thermal conductivity of the HFO-1336mzz itself is lower than those of other HFOs; and iii) When it is mixed with the polyol or another component (additive), the additive (in particular, a catalyst, a foam stabilizer, or the like) does not deactivate the properties thereof loss with lapse of time, and thus not only the storage stability of the mixed liquid (resin liquid) storage stability is excellent but also a good foam having a small cell size and being uniformly well-ordered can be stably produced in large quantities.

In the present invention, HFC, HC, carbonic acid gas, or water may be used together with the halogenated olefin as the blowing agent, so long as the global warming potential is within the range described above, the environmental destruction being suppressed within such a range without increasing (worsening) the thermal conductivity of the obtained foam.

Please note that water is changed to carbonic acid gas during urethanation reaction, and thus when it is used as the blowing agent in the urethanation reaction, the global warming potential thereof is generally assumed to be "1".

In the present invention, the blowing agent is preferably used in an amount of 5 to 70 parts by weight based on polyol 100 parts by weight of the polyol.

When the amount of the blowing agent used is less than 5 parts by weight, each cell is insufficiently foamed, it is easy to obtain a foam having a large density, and it is difficult to handle it. When the amount is more than 70 parts by weight, the obtained foam tends to decrease the density or to be shrunk. The amount is more preferably from 20 to 40 parts by weight.

[Catalyst]

As the catalyst used in the present invention, amine catalysts and metal catalysts, which have hitherto been generally used, may be used.

As the amine catalyst, for example, N,N,N',N'-tetramethyl hexadiamine, N,N,N',N'-tetramethyl propanediamine, N,N,N',N'',N''-pentamethyldiethylene triamine, N,N,N',N'-tetramethylethylene diamine, N,N,-dimethylbenzyl amine, N-methylmorpholine, N-ethylmorpholine, triethylene diamine, N,N',N'-trimethylaminoethyl piperazine, N,N-dimethylcyclohexyl amine, N,N',N''-tris(3-dimethylaminopropyl)hexahydro-s-triazin, bis(dimethylaminoethyl)ether, N,N-aminoethoxyethanol, N,N-dimethylaminohexanol, tetramethyl hexadiamine, 1-methylimidazole, 1-isobutyl-2-methylimidazole, and 1,2-dimethylimidazole may be used.

As the metal catalyst, for example, stannous octoate; dibutyltin dialurate; lead octoate; and potassium salts such as potassium acetate and potassium octoate may be used.

In addition to the amine catalysts and the metal catalysts, it is also possible to use quaternary ammonium salts of a fatty acid such as formic acid or acetic acid.

The catalyst described above may be alone or as a mixture of multiple kinds thereof.

In the present invention the catalyst is preferably used in an amount of about 0.1 to 15 parts by weight, more preferably 2.0 to 4.5 parts by weight, based on 100 parts by weight of the polyol.

In the present invention, when the blowing agent contains HFO-1233zd (1-chloro-3,3,3-trifluoropropene) and the urethanation reaction is not performed immediately after the blowing agent is mixed with the polyol and other components (additive, and the like), it is preferable to use an imidazole amine catalyst, such as 1-methyl imidazole, 1-isobutyl-2-methyl imidazole, or 1,2-dimethyl imidazole.

When such an imidazole amine catalyst is used, the catalytic performance is not deactivated for a longtime even after it is mixed with HFO-1233zd, and thus the storage stability of the mixed liquid (resin liquid) can be sufficiently maintained.

In the production of the rigid polyurethane foam of the present invention, in addition to the polyol, polyisocyanate, blowing agent and catalyst described above, additives, which are generally used upon production of a rigid polyurethane foam, may be used if necessary, for example, a foam stabilizer, a flame retardant, a compatibilizer, a viscosity reducer, a coloring agent, a stabilizer, a cross-linking agent, and the like.

[Foam Stabilizer]

The foam stabilizer may include silicone compounds and fluorine compounds, which have hitherto been generally used.

The foam stabilizer is preferably used in an amount of 0.1 to 10 parts by weight based on 100 parts by weight of the polyol.

[Flame Retardant]

As the flame retardant, for example, phosphoric acid esters such as trimethyl phosphate, triethyl phosphate, trischloroethyl phosphate, and trischloropropyl phosphate are fit to use.

The flame retardant is preferably used in an amount of 5 to 40 parts by weight based on 100 parts by weight of the polyol. When the amount is less than 5 parts by weight, it may be sometimes difficult to pass the combustion test prescribed in JIS-A-9511. When the amount is more than 40 parts by weight, the plastic action is too strong, and thus the shrinkage and the mechanical strength of the foam may sometimes be impaired. The amount is more preferably from 10 to 30 parts by weight.

The rigid polyurethane foam of the present invention is obtained by reacting the polyol with the polyisocyanate in the presence of at least the blowing agent, the catalyst, and the like.

The production method thereof is not particularly limited. For example, a foaming method in which the polyisocyanate and a mixture containing the polyol, the blowing agent, the catalyst, the foam stabilizer, the flame retardant and other additives are continuously or non-continuously mixed in a fixed ratio may be used, or a general high pressure or low pressure foaming machine for the rigid polyurethane foam may be used.

The rigid polyurethane foam of the present invention encompasses, in addition to the generally called rigid polyurethane foam, rigid polyurethane foams including urethane-modified polyisocyanurate foams, rigid polyisocyanurate foams, and other rigid foams.

The rigid polyurethane foam of the present invention has preferably a density of 33 to 60 kg/m$^3$, cell size of 230 μm or less, and a thermal conductivity of 0.0190 W/(m·K) or less; more preferably a density of 35 to 45 kg/m$^3$, a cell size of 210 μm or less, and a thermal conductivity of 0.0180 W/(m·K) or less.

The rigid polyurethane foam of the present invention having the properties described above is the foam which has a very little influence on the global warming and has the excellent thermal insulation property and flame retardancy.

EXAMPLES

Examples 1 to 25 and Comparative Examples 1 to 11

Starting materials used in Examples and Comparative Examples are shown below.
<<Starting Material Used>>
[Polyol]
(Polyester Polyol)
  Polyol A: A polyester polyol produced using phthalic anhydride as an initiator, having a hydroxyl value of 315 mg KOH/g and a molecular weight of 360 (an aromatic concentration of 22% by weight)
  Polyol B: A polyester polyol produced using terephthalic acid as an initiator, having a hydroxyl value of 250 mg KOH/g and a molecular weight 450 (an aromatic concentration of 17% by weight)
(Polyether Polyol)
  Polyol C: A polyether polyol produced using sorbitol (non-amine-based) as an initiator, having a hydroxyl value of 450 mg KOH/g and a molecular weight 750
  Polyol D: A polyether polyol produced using sucrose (non-amine-based) as an initiator, having a hydroxyl value of 450 mg KOH/g and a molecular weight 600
  Polyol E: A polyether polyol produced using toluene diamine (aromatic amine-based), having a hydroxyl value of 420 mg KOH/g and a molecular weight 530
  Polyol F: A polyether polyol produced using ethylene diamine (aliphatic amine-based) as an initiator, having a hydroxyl value of 500 mg KOH/g and a molecular weight 450

[Blowing Agent]
  HFO-1336mzz (1,1,1,4,4,4-hexafluorobutene: "Formacel-1100" manufactured by DuPont Com.), having a global warming potential of 2
  HFO-1233zd (1-chloro-3,3,3-trifluoropropene: "Solstice LBA" manufactured by Honeywell, Inc.) having a global warming potential of 1
  C-pentane (cyclopentane: "Marukazole FH" manufactured by Maruzen Petrochemical Co., Ltd.), having a global warming potential of 11
  HFC-365mfc (1,1,1,3,3-pentafluorobutane: "Solkane 365 mfc" manufactured by Solvay Inc.), having a global warming potential: 804
  Water (which turns into carbonic acid gas during the urethanation reaction), having a global warming potential of 1

In the instant specification, the global warming potential (GWP) is a value described in "Fifth Assessment Report (2014)" published by Intergovernmental Panel on Climate Change (IPCC). It is said that the larger the numerical value of GWP, the bigger the influence on the global warming.

The GWP values of the blowing agents used in Examples and Comparative Examples were obtained as described below.

When the halogenated olefin was used alone, the values were as described above, and when the multiple halogenated olefins were used, the values were obtained as follows:

For example, in Example 24, both 1) HFO-1336mzz and 2) HFO-1233zd were used as the blowing agent.

(i) First, as shown in (Table A), an amount ratio of 1) HFO-1336mzz used and an amount ratio of 2) HFO-1233zd used were multiplied by the GWP value of each blowing agent to calculate weighting GWP values (the amount used×the GWP value). Specifically, the weighting GWP value of 1) HFO-1336mzz was 18×1=18 and the weighting GWP value of 2) HFO-1233zd was 14×2=28.

(ii) Next, each of the weighting GWP values calculated was added to calculate a total weighting GWP value. Specifically, the total weighting GWP value was 18+28=46.

(iii) Next, the total weighting GWP value was divided by the total amount used to calculate an average GWP value (the total weighting GWP/the total amount used). Specifically, the average GWP value was 46/32=1.4.

The obtained average GWP vale of 1.4 was used as the global warming potential (blowing agent) in Example 24.

TABLE A

| Kind of blowing agent | Amount used | GWP value | Load GWP value |
|---|---|---|---|
| 1) HFO-1336mzz | 18 | 1 | 18 |
| 2) HFO-1233zd | 14 | 2 | 28 |
| Total amount | 32 | — | 46 |

In Example 25, 1) HFO-1233zd and 2) c-pentane were used as the blowing agent.

(i) First, as shown in (Table B), an amount ratio of 1) HFO-1233zd used and an amount ratio of 2) c-pentane used were multiplied by the GWP value of each blowing agent to calculate weighting GWP values (the amount used×the GWP value). Specifically, the weighting GWP value of 1) HFO-1233zd was 20×1=20 and the weighting GWP value of 2) c-pentane was 5×11=55.

(ii) Next, each of the weighting GWP values calculated was added to calculate a total weighting GWP value. Specifically, the total weighting GWP value was 20+55=75.

(iii) Next, the total weighting GWP value was divided by the total amount used to calculate an average GWP value (the total weighting GWP/the total amount used). Specifically, the average GWP value was 75/25=3.

The obtained average GWP vale of 3 was used as the global warming potential (blowing agent) in Example 25.

TABLE B

| Kind of blowing agent | Amount used | GWP value | Load GWP value |
|---|---|---|---|
| 1) HFO-1233zd | 20 | 1 | 20 |
| 2) c-pentane | 5 | 11 | 55 |
| Total amount | 25 | — | 75 |

In the present invention, when multiple other blowing agents are used, the global warming potential (blowing agent) can be obtained in the same manner as above.

[Catalyst]
"TEDA-L33 (a tertiary amine catalyst)" manufactured by TOSHO Corporation
"DM-70 (an imidazole amine catalyst)" manufactured by TOSHO Corporation

[Foam Stabilizer]
"SH-193 (a silicone compound) manufactured by Dow Corning Toray Co., Ltd.

[Flame Retardant]
"TMCPP (trischloropropyl phosphate)" manufactured by Daihachi Chemical Industry Co., Ltd.

[Polyisocyanate]
MDI: polymeric MDI ("Millionate MR-200" manufactured by Tosho Corporation, having an NCO content of 31%)
TDI: tolylene diisocyanate ("Cosmonate T-80" manufactured by Mitsui Chemicals, Inc., having an NCO content of 48%)

<<Method for Producing Foam>>

A mixture having a blending composition shown in Tables 1 to 4 was stirred at 4500 revolutions/minute for 4 seconds using a hand mixer, and then the mixture was freely foamed in a wood box (250 mm×150 mm×300 mm) to obtain a rigid polyurethane foam.

A mixture having the same blending composition as above was stirred at 4500 revolutions/minute for 4 seconds using a hand mixer, and then the mixture was freely foamed on a metal plate of which temperature was adjusted to 45° C. to obtain a rigid polyurethane foam.

The polyol and the polyisocyanate were blended at a liquid temperature of 25° C. so that an isocyanate index (NCO INDEX) was 120.

The density, the cell size, the thermal conductivity (thermal insulation property), and the flame retardancy of each of the rigid polyurethane foams obtained in the production method described above were evaluated by the following methods.

The evaluation results are shown in Tables 1 to 4 together with the global warming potential of the blowing agent used.

With respect to Comparative Examples 7 and 8, the obtained foams had a weak resin backbone and were shrunk, and thus the evaluation could not be performed.

<<Evaluation Method>>

Density ($kg/m^3$): A test piece (100 mm×100 mm×100 mm) was cut from the rigid polyurethane foam, obtained by the free foaming in the wood box, and a density of the test piece was measured in accordance with JIS-A-9511.

Cell Size (μm): A test piece (200 mm×200 mm×50 mm) was cut from the rigid polyurethane foam, obtained by the free foaming on the metal plate of which temperature was adjusted to 45° C., a diameter of each cell (all cells contained in an area of 1 $mm^2$ at each position) was measured using a commercially available scanning electron microscope ("JSM-6700F" manufactured by JEOL Ltd.) at a magnification of 30 at 50 positions at 1 mm intervals in a thickness direction of the test piece, and an average value of the obtained cell diameters was calculated, which was used as a cell size.

Thermal Conductivity (W/(m·K)): A test piece (200 mm×200 mm×25 mm) was cut from the rigid polyurethane foam, obtained by the free foaming on the metal plate of which temperature was adjusted to 45° C., and a thermal conductivity was measured at an average temperature of 23° C. using "Auto XHC-074," manufactured by EKO instruments, in accordance with a heat flow meter method shown in JIS-A-1412.

Flame Retardancy: A test piece (150 mm×50 mm×13 mm) was cut from the rigid polyurethane foam, obtained by the free foaming in the wood box, and a flame retardancy of the test piece was measured in accordance with JIS-A-9511, Measurement Method B (a test piece satisfying a combustion hour of 120 seconds or less and a combustible and a combustion length of 60 mm or less is evaluated as "acceptance.").

(Evaluation Criteria)
○: Acceptance in JIS-A-9511 combustion test
X: Non-acceptance in the test

TABLE 1

| | | Example | | | | |
|---|---|---|---|---|---|---|
| | | 1 | 2 | 3 | 4 | 5 |
| Polyester polyol | polyol A (aromatic concentration of 22% by weight) | 90 | 70 | 30 | | 70 |
| | polyol B(aromatic concentration of 17% by weight) | | | | 70 | |
| Polyether polyol | polyol C (non-amine-based) | 10 | 30 | 70 | | |
| | polyol D (non-amine-based) | | | | 30 | |
| | polyol E (aromatic amine-based) | | | | | 30 |
| Blowing agent | HFO-1336mzz HFO-1233zd | 35 | 35 | 35 | 35 | 35 |
| Catalyst | TEDA-L33 (tertiary amine catalyst) | 3 | 3 | 3 | 3 | 3 |

TABLE 1-continued

|  |  | | | | | |
|---|---|---|---|---|---|---|
| Foam stabilizer | SH-193(silicone compound) | 3 | 3 | 3 | 3 | 3 |
| Flame retardant | TMCPP(phosphoric ester) | 20 | 20 | 20 | 20 | 20 |
| Polyisocyanate | MDI/TDI | 7/3 | 7/3 | 7/3 | 7/3 | 7/3 |
|  | NCO INDEX | 120 | 120 | 120 | 120 | 120 |
| Evaluation results | density [kg/m³] | 42 | 38 | 37 | 39 | 38 |
|  | cell size [μm] | 150 | 180 | 200 | 190 | 190 |
|  | thermal conductivity [W/(m·K)] | 0.0163 | 0.0170 | 0.0175 | 0.0172 | 0.0174 |
|  | flame retardancy | ○ | ○ | ○ | ○ | ○ |
|  | global warming potential (blowing agent) | 2 | 2 | 2 | 2 | 2 |

|  |  | Example | | | | |
|---|---|---|---|---|---|---|
|  |  | 6 | 7 | 8 | 9 | 10 |
| Polyester polyol | polyol A (aromatic concentration of 22% by weight) | 70 | 70 | 70 | 70 | 70 |
|  | polyol B(aromatic concentration of 17% by weight) |  |  |  |  |  |
| Polyether polyol | polyol C (non-amine-based) | 15 | 30 | 30 | 30 | 30 |
|  | polyol D (non-amine-based) |  |  |  |  |  |
|  | polyol E (aromatic amine-based) | 15 |  |  |  |  |
| Blowing agent | HFO-1336mzz |  |  |  |  |  |
|  | HFO-1233zd | 35 | 35 | 35 | 5 | 70 |
| Catalyst | TEDA-L33 (tertiary amine catalyst) | 3 | 3 | 3 | 3 | 3 |
| Foam stabilizer | SH-193(silicone compound) | 3 | 3 | 3 | 3 | 3 |
| Flame retardant | TMCPP(phosphoric ester) | 20 | 20 | 20 | 20 | 20 |
| Polyisocyanate | MDI/TDI | 7/3 | 8/2 | 5/5 | 7/3 | 7/3 |
|  | NCO INDEX | 120 | 120 | 120 | 120 | 120 |
| Evaluation results | density [kg/m³] | 39 | 38 | 42 | 60 | 33 |
|  | cell size [μm] | 190 | 200 | 150 | 150 | 200 |
|  | thermal conductivity [W/(m·K)] | 0.0173 | 0.0174 | 0.0162 | 0.0177 | 0.0178 |
|  | flame retardancy | ○ | ○ | ○ | ○ | ○ |
|  | global warming potential (blowing agent) | 2 | 2 | 2 | 2 | 2 |

TABLE 2

|  |  | Example | | | | |
|---|---|---|---|---|---|---|
|  |  | 11 | 12 | 13 | 14 | 15 |
| Polyester polyol | polyol A (aromatic concentration of 22% by weight) | 90 | 70 | 30 |  | 70 |
|  | polyol B (aromatic concentration of 17% by weight) |  |  |  | 70 |  |
| Polyether polyol | polyol C (non-amine-based) | 10 | 30 | 70 |  |  |
|  | polyol D (non-amine-based) |  |  |  | 30 |  |
|  | polyol E (aromatic amine-based) |  |  |  |  | 30 |
| Blowing agent | HFO-1336mzz |  |  |  |  |  |
|  | HFO-1233zd | 28 | 28 | 28 | 28 | 28 |
| Catalyst | TEDA-L33 (tertiary amine catalyst) | 3 | 3 | 3 | 3 | 3 |
| Foam stabilizer | SH-193(silicone compound) | 3 | 3 | 3 | 3 | 3 |

TABLE 2-continued

| | | | | | | |
|---|---|---|---|---|---|---|
| Flame retardant | TMCPP (phosphoric ester) | 20 | 20 | 20 | 20 | 20 |
| Polyisocyanate | MDI/TDI | 7/3 | 7/3 | 7/3 | 7/3 | 7/3 |
| | NCO INDEX | 120 | 120 | 120 | 120 | 120 |
| Evaluation results | density [kg/m$^3$] | 41 | 38 | 37 | 39 | 38 |
| | cell size [μm] | 160 | 200 | 210 | 210 | 210 |
| | thermal conductivity [W/(m · K)] | 0.0179 | 0.0182 | 0.0189 | 0.0186 | 0.0187 |
| | flame retardancy | ○ | ○ | ○ | ○ | ○ |
| | global warming potential (blowing agent) | 1 | 1 | 1 | 1 | 1 |

| | | Example | | | | |
|---|---|---|---|---|---|---|
| | | 16 | 17 | 18 | 19 | 20 |
| Polyester polyol | polyol A (aromatic concentration of 22% by weight) | 70 | 70 | 70 | 70 | 70 |
| | polyol B (aromatic concentration of 17% by weight) | | | | | |
| Polyether polyol | polyol C (non-amine-based) | 15 | 30 | 30 | 30 | 30 |
| | polyol D (non-amine-based) | | | | | |
| | polyol E (aromatic amine-based) | 15 | | | | |
| Blowing agent | HFO-1336mzz | | | | | |
| | HFO-1233zd | 28 | 28 | 28 | 5 | 70 |
| Catalyst | TEDA-L33 (tertiary amine catalyst) | 3 | 3 | 3 | 3 | 3 |
| Foam stabilizer | SH-193 (silicone compound) | 3 | 3 | 3 | 3 | 3 |
| Flame retardant | TMCPP (phosphoric ester) | 20 | 20 | 20 | 20 | 20 |
| Polyisocyanate | MDI/TDI | 7/3 | 8/2 | 5/5 | 7/3 | 7/3 |
| | NCO INDEX | 120 | 120 | 120 | 120 | 120 |
| Evaluation results | density [kg/m$^3$] | 38 | 37 | 41 | 60 | 33 |
| | cell size [μm] | 200 | 210 | 160 | 160 | 210 |
| | thermal conductivity [W/(m · K)] | 0.0185 | 0.0185 | 0.0177 | 0.0184 | 0.0189 |
| | flame retardancy | ○ | ○ | ○ | ○ | ○ |
| | global warming potential (blowing agent) | 1 | 1 | 1 | 1 | 1 |

TABLE 3

| | | Example | | | | |
|---|---|---|---|---|---|---|
| | | 21 | 22 | 23 | 24 | 25 |
| Polyester polyol | polyol A (aromatic concentration of 22% by weight) | 70 | 70 | 70 | 70 | 70 |
| Polyether polyol | polyol C (non-amine-based) | 30 | 15 | 30 | 30 | 30 |
| | polyol E (aromatic amine-based) | | 15 | | | |
| Blowing agent | HFO-1336mzz | | | | 18 | |
| | HFO-1233zd | 28 | 28 | 25 | 14 | 20 |
| | c-pentane | | | | | 5 |
| | Water | | | 0.5 | | |
| Catalyst | TEDA-L33 (tertiary amine catalyst) | | | | | |
| | DM-70 (imidazole amine catalyst) | 3.5 | 3 | 3 | 3.5 | 3.5 |
| Foam stabilizer | SH-193 (silicone compound) | 5 | 5 | 5 | 5 | 5 |
| Flame retardant | TMCPP (phosphoric ester) | 20 | 20 | 20 | 20 | 20 |

TABLE 3-continued

| | | Example | | | | |
|---|---|---|---|---|---|---|
| | | 21 | 22 | 23 | 24 | 25 |
| Polyisocyanate | MDI/TDI | 7/3 | 7/3 | 7/3 | 7/3 | 7/3 |
| | NCO INDEX | 120 | 120 | 120 | 120 | 120 |
| Evaluation results | density [kg/m³] | 40 | 41 | 39 | 40 | 40 |
| | cell size [μm] | 150 | 160 | 180 | 140 | 150 |
| | thermal conductivity [W/(m·K)] | 0.0174 | 0.0174 | 0.0178 | 0.0171 | 0.0179 |
| | flame retardancy | ◯ | ◯ | ◯ | ◯ | ◯ |
| | global warming potential (blowing agent) | 1 | 1 | 1 | 1.4 | 3 |

TABLE 4

| | | Comparative Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Polyester polyol | polyol A (aromatic concentration of 22% by weight) | 70 | 70 | 70 | 70 | 70 | 70 | 70 | 100 | | | |
| Polyether polyol | polyol C (non-amine-based) | | 30 | 30 | | | 30 | 30 | | 100 | 50 | |
| (aromatic amine-based) | polyol E | | | | | | | | | | 50 | 100 |
| | polyol F (aliphatic amine-based) | 30 | | | 30 | 30 | | | | | | |
| Blowing agent | HFO-1336mzz | 35 | | | | | 35 | 35 | 35 | 35 | 35 | 35 |
| | HFO-1233zd | | | | | 28 | | | | | | |
| | c-pentane | | 15 | | 15 | | | | | | | |
| | HFC-365mfc | | | 32 | | | | | | | | |
| Catalyst | TEDA-L33 (tertiary amine catalyst) | 3 | 3 | 33 | 3 | 3 | 3 | 3 | 3 | 3 | 3 | 3 |
| Foam stabilizer | SH-193 (silicone compound) | 3 | 3 | 3 | 3 | 3 | 3 | 3 | 3 | 3 | 3 | 3 |
| Flame retardant | TMCPP (phosphoric ester) | 20 | 20 | 20 | 20 | 20 | 20 | 20 | 20 | 20 | 20 | 20 |
| Polyisocyanate | MDI/TDI | 7/3 | 7/3 | 7/3 | 7/3 | 7/3 | 10/0 | 3/7 | 7/3 | 7/3 | 7/3 | 7/3 |
| | NCO INDEX | 120 | 120 | 120 | 120 | 120 | 120 | 120 | 120 | 120 | 120 | 120 |
| Evaluation results | density [kg/m³] | 37 | 38 | 37 | 42 | 37 | 37 | *1 | *1 | 37 | 36 | 36 |
| | cell size [μm] | 200 | 200 | 190 | 210 | 210 | 290 | | | 280 | 300 | 310 |
| | thermal conductivity [W/(m·K)] | 0.0178 | 0.0192 | 0.0172 | 0.0208 | 0.0180 | 0.0196 | | | 0.0193 | 0.0197 | 0.0203 |
| | flame retardancy | X | X | ◯ | X | X | ◯ | | | ◯ | ◯ | ◯ |
| | global warming potential (blowing agent) | 2 | 11 | 804 | 11 | 1 | 2 | | | 2 | 2 | 2 |

*1: The resin backbone of the obtained foam was weak and the foam was shrunk, and thus the evaluation could not be performed.

The invention claimed is:

1. A rigid polyurethane foam, which is obtained by mixing and reacting raw materials comprising a polyol, a polyisocyanate, a blowing agent, and a catalyst, wherein the polyol comprises a polyester polyol having an aromatic concentration of 17 to 35% by weight, and a non-amine-based polyether polyol and/or aromatic amine-based polyether polyol, the polyisocyanate is a mixture of MDI (diphenylmethane diisocyanate)/TDI (tolylene diisocyanate) in a weight ratio of 4/6 to 9/1, the blowing agent comprises a halogenated olefin, and the rigid polyurethane foam has a density of 33 to 60 kg/m³, a cell size of 230 μm or less, and a thermal conductivity of 0.0190 W/(m·K) or less.

2. The rigid polyurethane foam according to claim 1, wherein the polyol comprises polyester polyol (A) (the polyester polyol having an aromatic concentration of 17 to 35% by weight), and polyether polyol (B) (the non-amine-based polyether polyol and/or the aromatic amine-based polyether polyol),
a weight ratio of (A)/(B)=3/7 to 9/1.

3. The rigid polyurethane foam according to claim 1, wherein the blowing agent has a global warming potential of 10 or less.

4. The rigid polyurethane foam according to claim 1, wherein the halogenated olefin is 1,1,1,4,4,4-hexafluorobutene.

5. The rigid polyurethane foam according to claim 1, wherein a content of the blowing agent is 5 to 70 parts by weight based on 100 parts by weight of the polyol.

* * * * *